(12) United States Patent
Petts et al.

(10) Patent No.: US 10,013,492 B1
(45) Date of Patent: Jul. 3, 2018

(54) CATEGORIZATION BASED ON USER QUESTIONNAIRE

(75) Inventors: James C. Petts, Redmond, WA (US); Yong Xi, Seattle, WA (US); Laura Ellen Grit, Seattle, WA (US); Samuel A. Minter, Bellevue, WA (US); Lindsey Christina Fowler, Seattle, WA (US); Dennis Harding, Bothell, WA (US); Aaron James Dykstra, Federal Way, WA (US); George Ionkov, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 379 days.

(21) Appl. No.: 12/890,445

(22) Filed: Sep. 24, 2010

(51) Int. Cl.
G06F 17/30 (2006.01)
G09B 7/00 (2006.01)

(52) U.S. Cl.
CPC ......... *G06F 17/30867* (2013.01); *G09B 7/00* (2013.01)

(58) Field of Classification Search
CPC ...... G06F 17/30; G06F 17/30867; G09B 7/00
See application file for complete search history.

(56) References Cited

U.S. PATENT DOCUMENTS

| | | | |
|---|---|---|---|
| 6,164,974 A * | 12/2000 | Carlile et al. | 434/322 |
| 7,433,832 B1 * | 10/2008 | Bezos | G06Q 10/10 705/26.8 |
| 7,433,866 B2 * | 10/2008 | Berstis | G06Q 30/02 |
| 7,756,753 B1 * | 7/2010 | McFarland | 705/26.1 |
| 8,510,247 B1 * | 8/2013 | Kane, Jr. | G06N 5/02 706/46 |
| 8,554,640 B1 * | 10/2013 | Dykstra | G06Q 10/101 705/14.49 |
| 8,834,166 B1 * | 9/2014 | Ionkov | G06F 17/30595 434/178 |
| 9,390,402 B1 * | 7/2016 | Kane, Jr. | G06Q 10/101 |
| 2002/0002540 A1 * | 1/2002 | DeMello | G06Q 20/04 705/51 |
| 2002/0107759 A1 * | 8/2002 | An | G06Q 30/02 709/206 |
| 2002/0143489 A1 * | 10/2002 | Orchard | G01P 13/00 702/141 |
| 2002/0184189 A1 * | 12/2002 | Hay et al. | 707/1 |
| 2003/0018543 A1 * | 1/2003 | Alger et al. | 705/27 |
| 2003/0093336 A1 * | 5/2003 | Ukita et al. | 705/26 |
| 2004/0201633 A1 * | 10/2004 | Barsness | G06F 17/30716 715/864 |
| 2005/0049941 A1 * | 3/2005 | Kaplan | 705/27 |
| 2007/0269788 A1 * | 11/2007 | Flowers | G09B 7/00 434/350 |
| 2007/0292826 A1 * | 12/2007 | Goddy et al. | 434/156 |

(Continued)

*Primary Examiner* — Rehana Perveen
*Assistant Examiner* — Huen Wong
(74) *Attorney, Agent, or Firm* — Lee & Hayes, PLLC

(57) ABSTRACT

A customized questionnaire is generated for a content item, such as an eBook, audio file, video file, and so on. Upon an occurrence of predetermined event, the user is presented with the customized questionnaire soliciting responses to questions and/or rating evaluations relating to the content item. The responses may include reviews, ratings, recommendations of similar items, discussion topics, and other things. Information from the responses may be collected and associated with the content item to build a user-driven index.

33 Claims, 8 Drawing Sheets

(56) References Cited

U.S. PATENT DOCUMENTS

| | | | |
|---|---|---|---|
| 2009/0066722 A1* | 3/2009 | Kriger | G06Q 30/02 345/619 |
| 2009/0077658 A1* | 3/2009 | King et al. | 726/21 |
| 2009/0204840 A1* | 8/2009 | Sakamoto et al. | 713/340 |
| 2009/0307105 A1* | 12/2009 | Lemay et al. | 705/26 |
| 2010/0103186 A1* | 4/2010 | Luengen | G06F 3/14 345/589 |
| 2010/0280892 A1* | 11/2010 | Uzunalioglu et al. | 705/14.13 |
| 2010/0306122 A1* | 12/2010 | Shaffer | 705/319 |
| 2010/0315359 A1* | 12/2010 | Seong et al. | 345/173 |
| 2011/0047594 A1* | 2/2011 | Mahaffey et al. | 726/1 |
| 2011/0087955 A1* | 4/2011 | Ho | G06F 17/211 715/230 |
| 2011/0167342 A1* | 7/2011 | de la Pena | G06F 3/0488 715/702 |
| 2012/0116874 A1* | 5/2012 | Liu | G06Q 30/0251 705/14.49 |
| 2013/0185198 A1* | 7/2013 | Lorch | G06Q 20/29 705/39 |

* cited by examiner

CATEGORIZATION BASED ON USER QUESTIONNAIRE

BACKGROUND

A large and growing population of users is consuming increasing amounts of digital content, such as music, movies, audio books, electronic books, executables, and so on. These users employ various electronic access devices to consume such content. Among these access devices are electronic book readers, cellular telephones, personal digital assistants (PDAs), portable media players, tablet computers, netbooks, and the like. As more users consume content items electronically, new opportunities to interact with users are becoming available. In particular, feedback from users regarding content items offers valuable information that may be collected, organized and used to provide greater detail about the content items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes an architecture and techniques in which the occurrence of an event regarding a content item triggers a process of soliciting different types of information from the consumer/user of the content item with a questionnaire. Such information might include comments, opinions, ratings, reviews, summaries, survey or quiz responses, discussion questions and topics, recommendations for similar items, supplemental references, and so forth. Furthermore, the nature and extent of the consumer's interaction with the content item or other content items can be analyzed to evaluate the credibility of the consumer with regard to the content item, and to validate or rate the responses to the questionnaire provided by the consumer.

A content item may be essentially any form of electronic data that may be consumed on a device, such as a digital book, electronic magazine, electronic newspaper, music, movie, and so on. A content item may also be composed of multiple smaller portions, such as units, chapters, sections, pages, tracks, episodes, parts, subdivisions, scenes, intervals, periods, modules, and so forth.

Content item consumers, referred to herein as users, may access and render content items using a wide variety of access devices, such as electronic book reader devices, cellular telephones, personal digital assistants (PDAs), portable media players, tablet computers, and so forth. With the help of these devices, notifications or data pertaining to user progress through the content items may be collected, aggregated, and reported. This data may also indicate when a user has reached an idle point, completed a particular point in the content item or is organizing the content item in relation to other content items. At these points, additional information can be solicited from the user, relating to the content item.

For example, when the content item is an electronic book ("eBook") the reader may be asked to rate the eBook for adult content or reading level, provide a review or summary, indicate key concepts or the key idea of the eBook, or provide any other sort of feedback. For instance, the user might also, or alternatively, be asked to provide additional, similar, complementary, or supplementary materials, such as discussion questions and topics, or recommendations regarding other content items for further reading or consumption. Furthermore, the reader may be asked to provide detailed feedback about the eBook for further sub-categorization based on subject, style, genre, category, format, language, maturity rating, etc.

For discussion purposes, the architecture and techniques are described in an online context where the content items are retrieved from remote servers and completion information is gathered via an online service. However, the concepts described herein are also applicable in other architectures, such as offline environments.

Content Access Information Architecture

Figure 1:
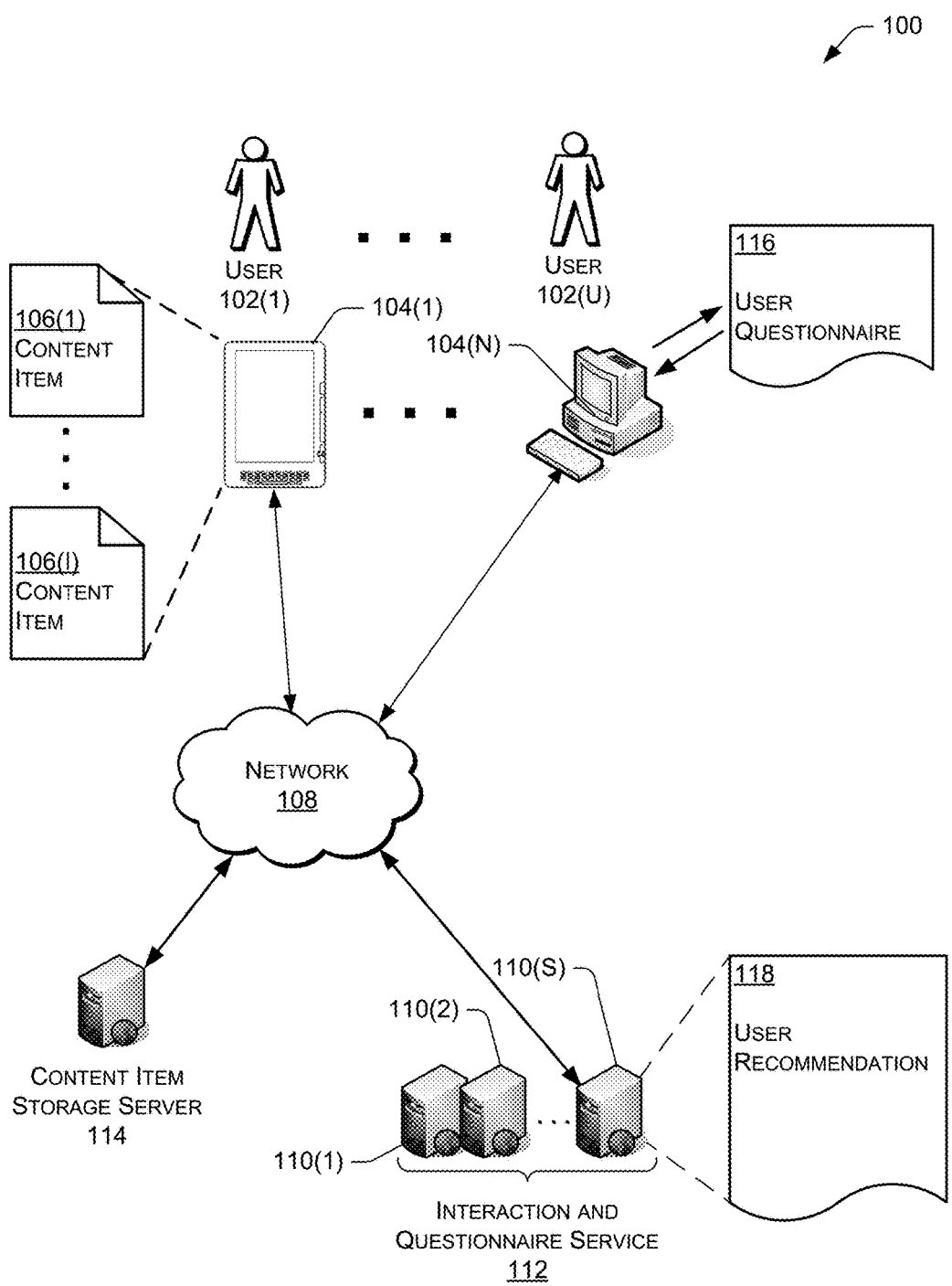
FIG. 1 is a block diagram of an illustrative architecture for monitoring consumption of content items, detecting the occurrence of predetermined events, and obtaining responses from a user upon presentation of a customized questionnaire.

FIG. 1 is an illustrative architecture 100 for monitoring user interactions with a content item, subject to user consent of the monitoring. Monitoring in this manner facilitates the detection of user interactions with content items, and also allows determining the nature and extent of the user's interaction with content items. Information regarding the nature and extent of the user's interaction with a content item can be used to evaluate the credibility or authority of any particular user with respect to the content item, and to thereby validate, rate, or evaluate any information that the user supplies regarding the content item. Also, the information can be used to determine the occurrence of an event(s) that, when triggered, facilitates presenting the user with a questionnaire about the content item.

Users 102(1), . . . , 102(U) are part of a population of people that utilize the architecture 100. The human users 102(1)-(U) consume a wide variety of content items, such as books, magazines, music, movies, and so on. As used herein, letters within parentheses, such as "(U)" or "(N)", indicate any integer number greater than zero.

Each representative user 102(1), . . . , 102(U) employs one or more corresponding electronic access devices 104(1), . . . , 104(N) to enable consumption of one or more content items 106(1), . . . , 106(I). For instance, the user 102(1) uses an electronic book ("eBook") reader device 104(1) to read digital textual material, such as electronic books, magazines, and the like. The user 102(U) employs a computer 104(N) to enjoy any number of content items, such as watching a movie, listening to audio, or reading electronic text-based material. While these example devices 104(1), . . . , 104(N) are shown for purposes of illustration and discussion, it is noted that many other electronic devices may be used, such as laptop computers, cellular telephones, portable media players, tablet computers, netbooks, notebooks, desktop computers, gaming consoles, DVD players, media centers, and the like.

The content items 106(1)-(I) are accessible from any of the access devices 104(1)-(N). The content items 106(1)-(I) may be stored locally or accessible from a remote location over a network 108. As illustrated, the access devices 104(1)-(N) may connect to the network 108 to access and retrieve the content items 106(1)-(I). The network 108 may be any type of communication network, including the Internet, a local area network, a wide area network, a wireless wide area network (WWAN), a cable television network, a wireless network, a telephone network, combinations of the foregoing, etc. The network 108 allows communicative coupling between the access devices 104(1)-(N) and remote servers, such as network resource servers 110(1)-(S). Of particular note, individual ones of the access devices 104 (1)-(N), such as the eBook reader device 104(1), may be equipped with a wireless communication interfaces that allow communication with the servers 110(1)-(S) over a wireless network 108. This allows information collected by the eBook reader device 104(1) (or other access devices) pertaining to consumption of content items 106(1)-(I) to be transferred over the network 108 to the remote servers 110(1), . . . , 110(S).

The network resource servers 110(1)-(S) may collectively have processing and storage capabilities to receive data from the access devices 104(1)-(N), to process the data, and to respond to requests for analysis and reporting. The servers 110(1)-(S) may be embodied in any number of ways, including as a single server, a cluster of servers, a server farm or data center, and so forth, although other server architectures (e.g., mainframe) may also be used.

The network resource servers 110(1)-(S) may be configured to host an interaction and questionnaire service 112. The interaction and questionnaire service 112 collects data pertaining to user interactions with the content items as well as data associated with the content items 106(1)-(I). In the illustrated embodiment, described in more detail below, the user interactions are recorded in data items referred to as content access events (CAEs).

The interaction and questionnaire service 112 may be configured to receive CAEs from the access devices 104(1)-(N), or might otherwise capture data indicative of an access device's attempts to access or consume the content items 106(1)-(I). This information may be used to generate user consumption metrics, derive completion information and statistics, determine the occurrence of predetermined events, and/or evaluate the nature and extent of a user's interaction with any particular content item.

The content items 106(1)-(I) may be stored locally on the access devices 104(1)-(N), or retrieved from a content item storage server 114 or other network resources, which may be accessed via the network 108. The content item storage server 114 may store or otherwise have access to content items that can be presented on the access devices 104(1)-(N). The server 114 may have processing and storage capabilities to receive requests for content items 106(1)-(I) and to facilitate purchase and/or delivery of those content items 106(1)-(I) to the access devices 104(1)-(N). In some implementations, the server 114 may store the content items 106(1)-(4 although in other implementations, the server 114 merely facilitates access to, purchase, and/or delivery of those content items 106(1)-(I). The server 114 may be embodied in any number of ways, including as a single server, a cluster of servers, a server farm or data center, and so forth, although other server architectures (e.g., mainframe) may also be used.

Alternatively, the content items 106(1)-(I) may be made available to the access devices 104(1)-(N) through offline mechanisms. For instance, content items 106(1)-(I) may be preloaded on the devices 104(1)-(N), or the content items 106(1)-(I) may be stored on portable media that can be accessed by the devices 104(1)-(N). For instance, electronic books and/or magazines may be delivered on portable storage devices (e.g., flash memory) that can be accessed and played by the access devices. Regardless of how the access devices 104(1)-(N) obtain the content items 106(1)-(4 the interaction and questionnaire service 112 may collect content access events (CAEs) for the purpose of soliciting user feedback via a questionnaire.

In one example of this architecture in use, suppose the user 102(1) is reading contemporaneously several books on the eBook reader device 104(1). At some point, the user 102(1) authorizes collection of access data by the interaction and questionnaire service 112 and, thereafter, accesses an eBook. As the user 102(1) turns the pages, highlights passages, adds annotations, completes a chapter, or the like, data about user's interaction with the content item is collected by the eBook reader device 104(1). This may include time spent on each page, annotations and their details, geographic location, motion during access, moving the eBook to an archive file, and so forth.

At some point, the user 102(1) finishes reading a chapter of the eBook or the entire eBook itself, and the completion of the chapter and/or eBook is detected based on the user interaction data. Interaction and questionnaire service 112, the access device 104(1), or both, may then solicit different types of information from the user who just completed the chapter and/or eBook. For instance, the service 112 and/or the device 104(1) may solicit this information from the user, such as via a user questionnaire 116 illustrated in FIG. 1.

Many types of information might be solicited as part of the questionnaire 116, depending on the embodiment, particular circumstances, and/or the type of content item or eBook that has just been completed. For example, the user 102(1) may be asked to answer questions about the eBook, to rate the eBook based on suitability level or reading difficulty, to provide a review or comments, or to indicate key ideas or concepts found in the eBook. Other possibilities include requesting specific types of recommendations, such as recommendations of similar content items, referrals to other content items that might describe complementary or contrary viewpoints, and references to explanatory materials. The user 102(1) might also be requested to provide supplemental materials, such as by authoring questions and topics for discussion groups or questions for other users 102(U) to test their comprehension of the completed item. The user 102(1) may also be asked questions to test his or her own comprehension of the content item 106(1). The questionnaire 116 can be formatted as questions, quizzes, tests, inquiries, and so forth.

The questionnaire 116 might be directed toward the subject matter of the content item 106(1), or about other things relating to the content item 106(1) such as the formatting or presentation of the content item 106(1). The user 102(1) could also be asked to evaluate likely target audiences or other peripheral information that might be useful to authors and publishers. As such, the questionnaire 116 can be supplied by the authors and/or publishers or other sources of the content item 106(1). Questionnaire questions and/or rating evaluations could also be generated or selected based on characteristics of the user's interaction with the content item 106(1), such as which portions of the book received the most attention, highlighting, or annotations by the user.

Questionnaire responses are entered by the user 102(1) and collected by the access device 104(1) and/or the interaction and questionnaire service 112. User responses to the questionnaire 116 can be input in the form of free text user input, menus, list boxes, check boxes, radio buttons, sliders and so on. Any information solicited and obtained from the user 102(1) can be used to classify the content item 106(1) and construct a user-driven taxonomy of the content item 106(1) by also associating information gathered from other users 102(U) about the same content item 106(1). The solicited information can also be subsequently shown to other users 102(U) at times when they are evaluating the content item 106(1). Information can also be used in determining appropriate suggestions or recommendations for presentation to other users 102(U) who complete the content item 106(1). In addition, information can be offered to other users 102(U) as additional or supplemental information when those users 102(U) consume or complete the content item 106(1). The presentation of this information is represented generally in FIG. 1 as a user recommendation 118.

When presenting information that has been obtained from users 102(1)-(U) in this manner, the information can be validated, weighted or rated based on the credibility of the user 102(U) who provided the information. This credibility, in turn, can be based on the nature and extent of the user's interaction with the content item 106(1), other content items 106(I) or an established reputation. For example, a review and rating value from a particular user 102(1) can be accompanied by a credibility or reputation score based on a variety of factors that might include measurements of how fully the user 102(1) engaged or interacted with the content item 106(1), a history of interactions with other similar content items 106(I), or independent indicia of reputation or qualifications such as subject matter expertise (e.g., a professor, professional, etc.).

CAEs can be monitored and analyzed to determine the nature and extent of the user's interaction with the content item 106(1). For example, the average time a user 102(1) viewed respective pages or chapters of a content item 106(1) can be calculated. It might also be noted whether a user 102(1) actually read or consumed each page or portion of the content item 106(1), and how long it took the user 102(1) to consume the entire content item 106(1) from start to finish.

Example Access Device

Figure 2:
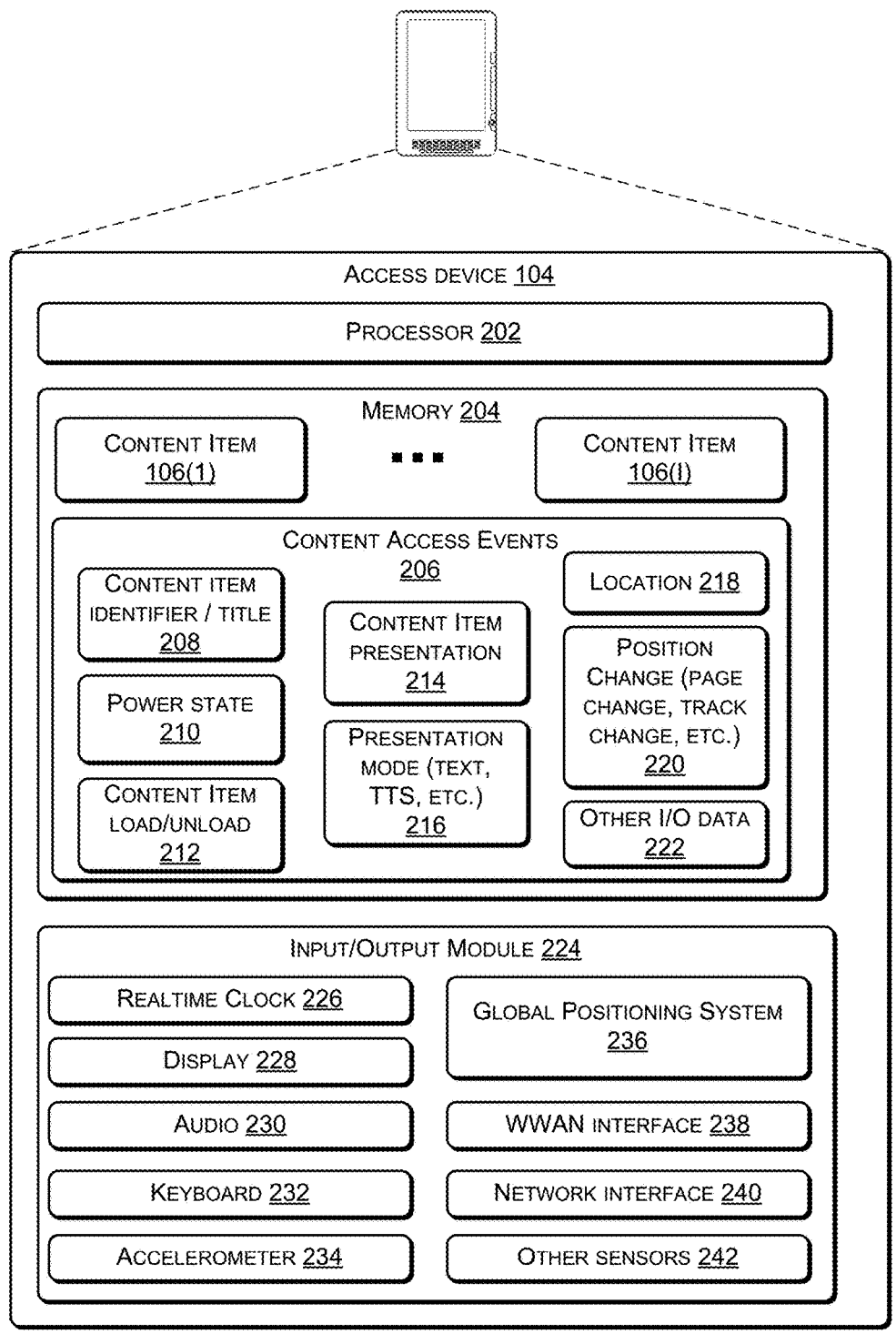
FIG. 2 is a block diagram illustrating selected modules in an access device of FIG. 1 that retrieves and presents content items and presents a customized questionnaire.

FIG. 2 shows selected modules in an illustrative access device 104 from FIG. 1. The access device 104 includes one or more processors 202 configured to execute instructions and access data stored in memory 204. The memory 204 is representative of computer-readable storage that may be implemented as volatile and/or non-volatile memory. The combination of the processors 202 and the memory 204 embody operational logic that is functional to perform the actions and processes that are attributed herein to access devices 104.

The content items 106(1)-(I) may be stored in the memory 204 (as shown) or otherwise accessed by the access device 104(1) for consumption. For example, an electronic book reader may render content of an electronic book on a display for viewing, or an electronic player device may play audible sounds from a music track for listening.

During access of the content items 106(1)-(4 the access device 104(1) generates content access events (CAEs) 206 that describe interactions with the content items 106(1)-(I). The CAEs 206 may manifest as various forms of data, such as access device status, flags, events, user inputs, etc. In some implementations, the CAEs 206 may be stored in the memory 204 (as shown) and/or stored remotely (e.g., in memory of the interaction and questionnaire service 112). While many CAEs 206 may be available, in some implementations only selected CAEs may be stored. In one particular implementation (as illustrated in FIG. 2), the CAEs 206 may include:

- A content item identifier 208, such as title, identification number, alphanumeric string, etc.
- A power state 210 that indicates which components of the access device 104 are active. For example, whether network interfaces or radios are on, off, or in sleep mode during access of a content item 106(1).
- A load and/or unload state 212 to indicate whether a content item 106(1) is loaded into the memory 204. The endpoints of the load or unload may also be stored, as well as whether the user 102(1) retrieved a content item 106(1) from external storage and stored in the memory 204, or vice versa. For example, whether a content item(s) 106(1)-(I) is moved to an archive file or deleted from memory 204.
- A content item presentation state 214 to indicate when a content item 106(1) or portion of a content item 106(1) is accessed by the user 102(1) for display, playback, etc.
- A presentation mode 216 that specifies various modes, such as orientation of display, whether textual data was read using a text-to-speech (TTS) feature, translated, etc.
- A location 218 of the access device 104(1) when it accessed the content item 106(1), including venue (e.g., airplane, night club, etc.), specific geolocation, or both.
- A position change 220 in the content item 106(1) during access. For example, this might indicate turning to a specified page or other navigation within a content item 106(1) or between different content items 106(I).
- Other input/output data 222 that may be captured and stored by the access device 104(1). For example, accelerometer data may be included to determine when the user 102(1) was in motion during consumption of content.

The access device 104(1) further includes a set of input/output devices grouped within an input/output module 224, which may be used to provide the input/output data 222 or other information in the CAEs 206. Relevant input/output devices include:

- A real-time clock 226 to provide date and time. This clock may be used to compute time-based CAE, such as when a content item 106(1) is accessed, or how long a user 102(1) remains in a section of the content item 106(1).
- One or more displays 228 to present content items 106(1)-(I) visually to the user 102(1), and optionally act as an input where a touch-sensitive display is used.
- An audio device 230 to provide audio input and/or output of content items 106(1)-(I).
- A keyboard 232 to facilitate user input and may include pointing devices such as a joystick, mouse, touch screen, control keys, etc.

An accelerometer 234 to generate orientation and relative motion input. For example, this may be used to determine orientation of the access device 104(1) during consumption of a content item 106(1).

A global positioning system (GPS) 236 to enable determination of geolocation, time data, velocity, etc. The GPS 236 may be used to generate position or location-based CAEs that may be used to help determine where user behavior occurs.

A wireless wide-area network (WWAN) 238 to provide a communication connection to the network 108. A network interface 240 to facilitate a local wired or wireless communication connection to the network 108, and may be used to identify and track particular wireless networks to which the electronic device connects.

Other sensors 242, which may include ambient light level sensors, barometric pressure, temperature, user biometrics, etc.

Example Server

Figure 3:
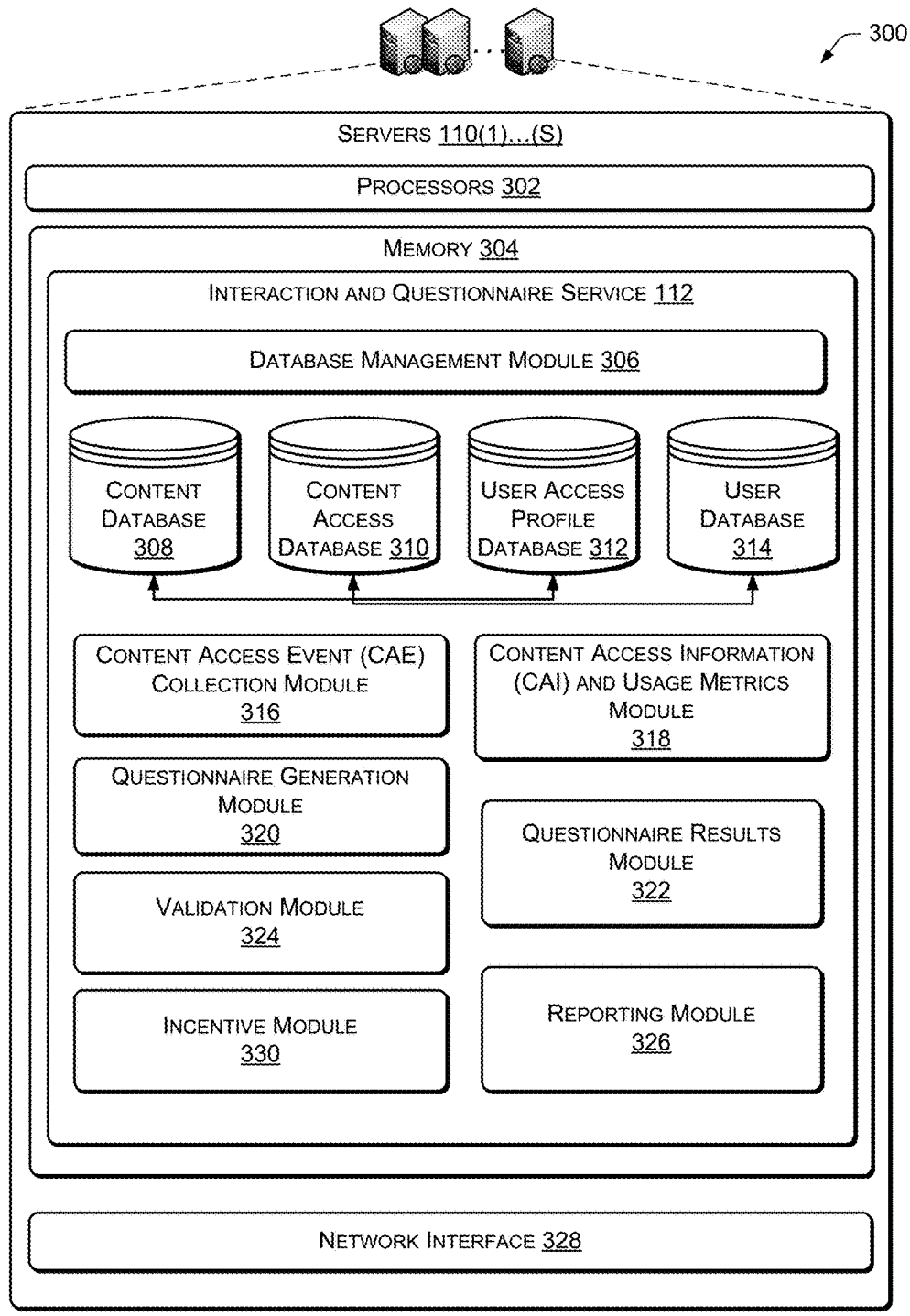
FIG. 3 is a block diagram illustrating selected modules in a server system used to host an interaction and questionnaire service, as shown in the architecture of FIG. 1.

FIG. 3 shows selected modules 300 in the system of servers 110(1)-(S) used to host the interaction and questionnaire service 112, as shown in the architecture of FIG. 1. The server system 110(1)-(S) includes the processors 302 that execute instructions and access data stored in a memory 304. The memory 304 implements a computer-readable storage media that may include, for example, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a processor. The combination of processors 302 and memory 304 embody operational logic that is functional to perform the actions and processes that are attributed herein to the interaction and questionnaire service 112.

Selected modules are shown stored in the memory 304. These modules provide the functionality to implement the interaction and questionnaire service 112. One or more databases may reside in the memory 304. A database management module 306 is configured to place data in, and retrieve data from, the databases. In this example, four databases are shown, including a content database 308, a content access database 310, a user access profile database 312, and a user database 314. Although shown as contained within the memory 304, these databases may also reside separately from the servers 110(1)-(S), but remain accessible to them. The first three databases 308-312, and selected items of data stored therein, are discussed in more detail below with reference to FIGS. 4-6, respectively. The user database 314 may include information such as user name, age, gender, social affiliations, geolocation, demographics, etc.

A content access event (CAE) collection module 316 may also be stored in memory 304. The CAE collection module 316 is configured to gather content access event data from the access devices 104(1)-(N). As described above with respect to FIG. 2, the CAEs 206 includes access device status, flags, events, and user inputs. For example, the CAE collection module 316 may gather a set of CAEs 206 from the access device 104(1) indicating that the item "To Serve Mankind" was last displayed on screen two months ago for a period of ten minutes in a landscape presentation mode while on an airplane at an altitude of 31,000 feet and speed of 513 miles per hour. Furthermore, the user navigated through pages 57-64 during that time before switching to TTS presentation. All of these factual data points may be captured as CAEs 206.

A content access information (CAI) and usage metrics module 318 may be stored in the memory 304 and configured to generate CAI statistics from the CAE data collected by the CAE collection module 316 and to derive content usage metrics from the CAI and CAE data. The CAI is described in more detail below with reference to FIG. 5. In another implementation, the access device 104 may process the CAEs 206 to produce the CAI or an intermediate data set, resulting in a smaller set of data for transmission over network 108 and/or to reduce processing load on the interaction and questionnaire service 112.

A questionnaire generation module 320 may be stored in the memory 304 to generate user questionnaires 116 to be presented to and answered by users 102(1)-(U) of particular content items 106(1)-(I) upon the occurrence of predetermined events, such as, reaching an idle point(s), completion of a portion of those content items 106(1)-(4 completion of those content items 106(1)-(4 conclusion of annotations or highlights, at the conclusion of an allotted time period and so on. A user 102(1) may be deemed to have completed a content item 106(1) upon reaching the last page of an eBook or upon navigating through the majority of the content item 106(1) and subsequently navigating away from the content item 106(1).

Questionnaires 116 may be the same for every content item 106(1)-(I) and every user 102(1)-(U), or may be customized depending on the particular content item 106(1) that is activated and/or the particular user 102(1) who is interacting with the content item 106(1). Thus, upon the occurrence of a predetermined event, like the conclusion of the content item 106(1), the user 102(1) may receive a different type of questionnaire 116 depending on the content item 106(1) or the type of content item 106(1)-(I). Similarly, different users 102(1)-(U) completing a particular content item 106(1) may receive different questionnaires or types of questionnaires: Some users 102(1)-(U) may receive requests for reviews, while other users 1-2(1)-(U) receive requests for providing ratings or recommendations. Furthermore, the type of input available to receive responses may be specific to content items 106(1)-(I) or users 102(1)-(U). For example, a certain user 102(1) may only be provided with radio buttons to respond to questionnaires. The choice of questionnaire 116 to be used with a particular user 102(1) with respect to a particular content item 106(1) can be preconfigured for each user 102(1) and/or content item 106(1), or chosen dynamically or automatically based on some algorithm in light of known characteristics of the user 102(1) and/or content item 106(1).

A questionnaire results module 322 may also reside at the server system 110 and reside within the memory 304. The questionnaire results module 322 receives and stores the results of questionnaires. For example, it stores ratings, recommendations, reviews, and other information provided by users 102(1)-(U) as a result of answering questionnaires 116. Furthermore, the questionnaire results module 322 may extract and process specific information from the results of the questionnaires 116 and forward them to be utilized in constructing a user driven index as part of the content database 308, as further detailed below.

A validation module 324 in the memory 304 validates information provided by users 102(1)-(U) in response to questionnaires 116. Validation is performed by evaluating the nature and extent of a user's interaction 102(1) with the content item 106(1). Higher or more extensive interaction results in a higher degree of validation being associated with the user's input. Generally, each set of information resulting from a particular questionnaire 116 is associated with a validation score or rating. The nature and extent of the user's interaction with the content item 106(1) is evaluated based on an analysis of CAE's associated with the user's consumption of the content item 106(1). Furthermore, validation can be performed by evaluating the nature and extent of a user's past interaction with other customized questionnaires 116. For example, a user 102(1) with a history of responding to questionnaires 116 presented to the user while engaged with previous content items 106(1)-(I) can have a higher degree of validation associated with the user's current input for a customized questionnaire 116. Furthermore, the quality, characteristics and features of the user's input can also contribute to the degree of validation associated with the input as further detailed below.

A report generation module 326 is configured to transform the questionnaire results and associated validation scores into selected formats and representations that may be used in conjunction with content item descriptions, listings of content items, and other data that may be presented to other users 102(U). For example, questionnaire results may accompany content item descriptions in an online storefront. If desired, a user 102(1) contemplating the purchase of a particular content item 106(1) may look at reviews or ratings supplied by other users 102(U) as a result of questionnaires 116. Alternatively, certain types of questionnaire information, such as further recommendations or discussion questions, may be presented to other users 102(U) when they interact with and/or complete a content item 106(1).

The server system 110 may also be equipped with a network interface 328, which provides a local wired or wireless communication connection to the network 108. The network interface 328 allows for communication with the access devices 104 via the network 108, as shown in FIG. 1.

An incentive module 330 is configured to generate and present incentives to users 102(1)-(U) for providing responses solicited by the questionnaire 116. The incentives can be monetary or non-monetary. For example, monetary incentives can be in the form of discounts on the purchase of available content items 106(1)-(I). Non-monetary incentives can take the form of reward points to be accumulated and redeemed to obtain content items 106(1)-(I) or other goods/services. In another example, the non-monetary incentive may be in the form of obtaining status as a credible and respected reviewer. Obtaining such status can permit the user 102(1) to access further rewards and privileges reserved for users 102(1)-(U) possessing such standing.

Figure 4:
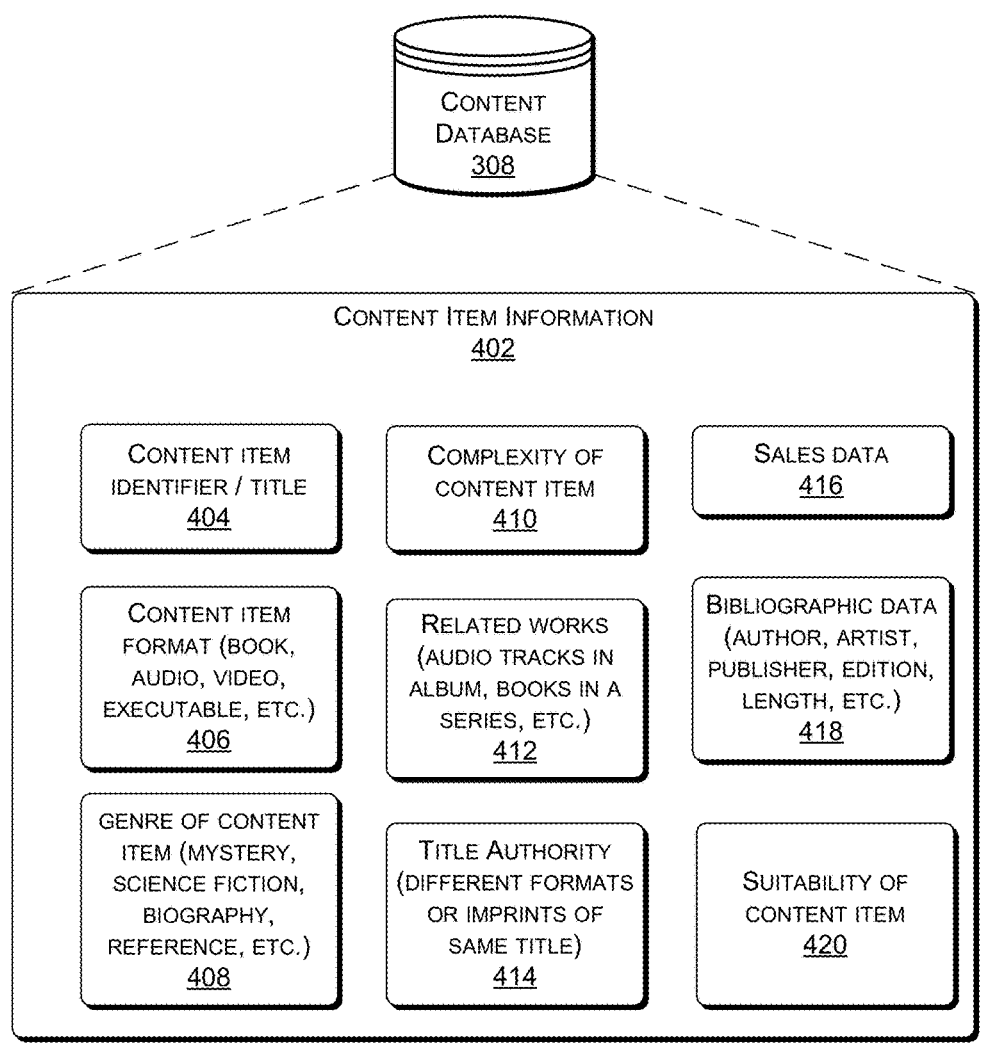
FIG. 4 shows an illustrative content database of FIG. 3, which may be used to store content items to be retrieved by the access devices and/or information about the content items.

FIG. 4 shows the illustrative content database 308 maintained at, or accessible by, the servers 110(1)-(S) of FIG. 3. The content database 308 is configured to contain content item information 402, which includes essentially any information pertaining to content items 106(1)-(I) that a user 102(1) may wish to access and consume. As mentioned previously, information from responses to questionnaires 116 may be used to populate the content item information 402. For discussion purposes, the content item information 402 may include the following:

Content item identification 404, such as title, identification number, invariant reference number, etc.

Content item format 406, such as whether the content item 106(1) is available as a book, audio, video, executable program, etc.

Genre of content item 408, such as mystery, science fiction, biography, horror, reference, game, utility, etc. For example, responses by a user 102(1) to a questionnaire 116 can provide broad categories associated with the content item 102(1) such as novel, textbook, history, biography, compilation, and so on. Furthermore, user responses can further subcategorize the content item 106(1) into granular details such as historical, first person novel, adapted to a movie, deceased author, etc.

Complexity of content item 410. For example, in textual content items 106(1), complexity may be determined based on a measure of readability. Examples of readability measurement include a Flesch-Kincaid Readability score, assessment of reading grade level (i.e. preschool—college level), the mean and variance of reading velocity, frequency of dictionary look-ups, or other metrics which may be used to ascertain the relative intricacy of the content item 106(1), or a combination of these measurements. Complexity of other types of content items 106(I) may be determined by other suitable metrics. For example, a musical piece may have complexity determined by spectral analysis, or an executable may have complexity determined by the size of the code and number of possible user inputs during use. In another implementation, complexity may be derived from user feedback.

Related works 412, such as music tracks found in the same album, books in a series, movies by the same director, etc. Moreover, user responses can further identify item(s) related to a particular content item across different forms of media (e.g. music, video, audio, etc.).

Title authority 414, which links or associates multiple instances of the same work or set of works (e.g., different formats or imprints of the same title).

Sales data 416, such as historical sales data, quantities sold/licensed, profit margin, returns, etc.

Bibliographic data 418, such as author, artist, publisher, edition, length, catalog number, etc.

Suitability of content item 420, such as the degree of violence, nudity, sexual content, profanity, drugs, adult themes, etc. For example, a graphic novel about serial killers can be identified as possessing material not suitable for younger users or those that may be sensitive to the subject matter. Suitability can be expressed in terms of generally accepted ratings system such as for movies (e.g. G, PG, PG-13, R, NC-17, etc.).

Figure 5:
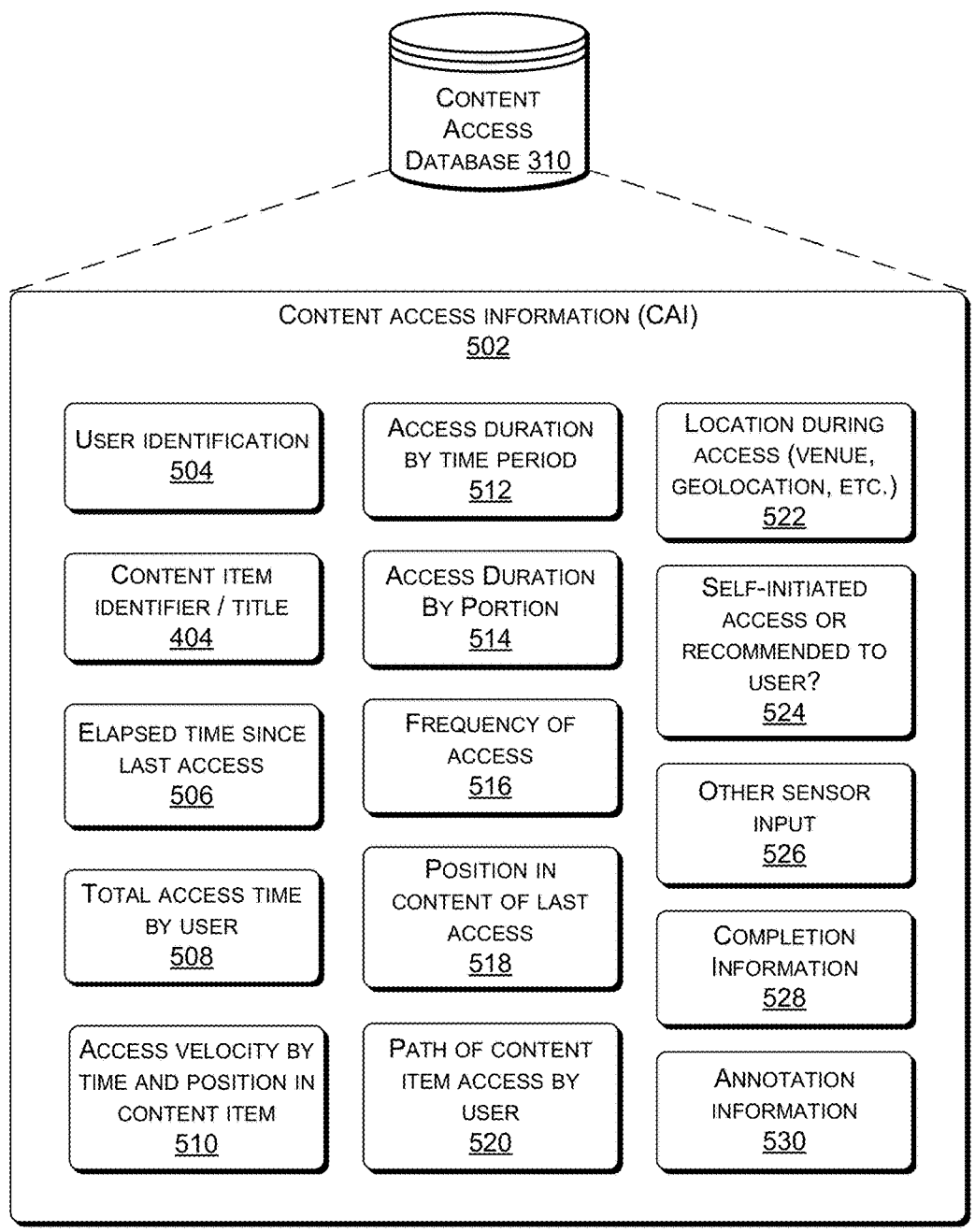
FIG. 5 shows an illustrative content access database of FIG. 3, which may be used to store content access information.

FIG. 5 shows the illustrative content access database 310 of FIG. 3, which is configured to contain content access information 502. The content access information 502 may be derived from CAEs 206. For discussion purposes, the content access information 502 may include the following:

A user identification 504, allowing association of a particular user with a particular set of content access information.

A content item identification 404, as described above.

An elapsed time since last access 506. In one implementation, access may be defined as a user 102(1) interacting with the content item 106(1) such that minimum duration thresholds are exceeded. For example, access to a book may be defined as two page turns in over ten seconds, to minimize erroneous data from inadvertent interaction such as incorrectly selecting a book.

A total access time of the content item by the user 508.

An access velocity 510 (a rate of item consumption per unit time) by time and/or position in the content item 106(1). For example, the user 102(1) read 113 words per minute in chapter 3, or the user 102(1) read page 15 in 54 seconds.

An access duration by time period 512. For example, the user 102(1) read for 37 minutes on April 1. This access duration by time period 512 may be for a single content item 106(1) or for all content items 106(1)-(I) accessed by a user 102(1) during a specified time period selected.

An access duration by portion 514. For example, this data might indicate how long the user 102(1) spent on a particular page, chapter, section, or other portion of a content item 106(1).

A frequency of access 516. For example, how often a content item 106(1) or portion of a content item 106(1) is accessed.

A position in content of last access 518. For example, the position in content of the last access was 237 words into chapter 5.

A data item 520 pertaining to the path of content item 106(1) access by user 102(1). For example, a path may track as the user 102(1) skips from chapter 1 to chapter 5, then back to chapter 3, and then switched to another book, and finally returned to read chapter 7.

A location during access 522. Locations include venues such as airplanes, night clubs, restaurants, etc., specific geolocation such as 48.93861° N 119.435° W, or both. For example, the user 102(1) accessed content item 106(1) from access device 104(1) which was located in Trafalgar Square.

An initial access of the content item 524. Specifically, whether the initial access was self-initiated or the result of a personal or automated recommendation to a user 102(1).

Data derived from other sensor inputs 526, such as an accelerometer or ambient light sensor. For example, accelerometer input may provide data indicating the user 102(1) reads while walking. In another example, ambient light input in conjunction with other CAI may indicate that users 102(1)-(U) have a greater rate of abandonment when reading in low light levels. In yet another example, deleting or moving a content item 106(1) to an archive file or another inactive section Completion information 528, indicating whether a specific portion of the content item 106(1) has been completed or whether the content item 106(1) itself has been completed. Completion of a content item 106(1) may be evaluated using various different criteria, such as whether the user 102(1) has reached the last page of an eBook or has sequentially navigated through a majority of a content item 106(1).

Annotation information 530, such as annotations made by users 102(1)-(U). Annotations can be in the form of notes, highlights, bookmarks, etc.

Figure 6:
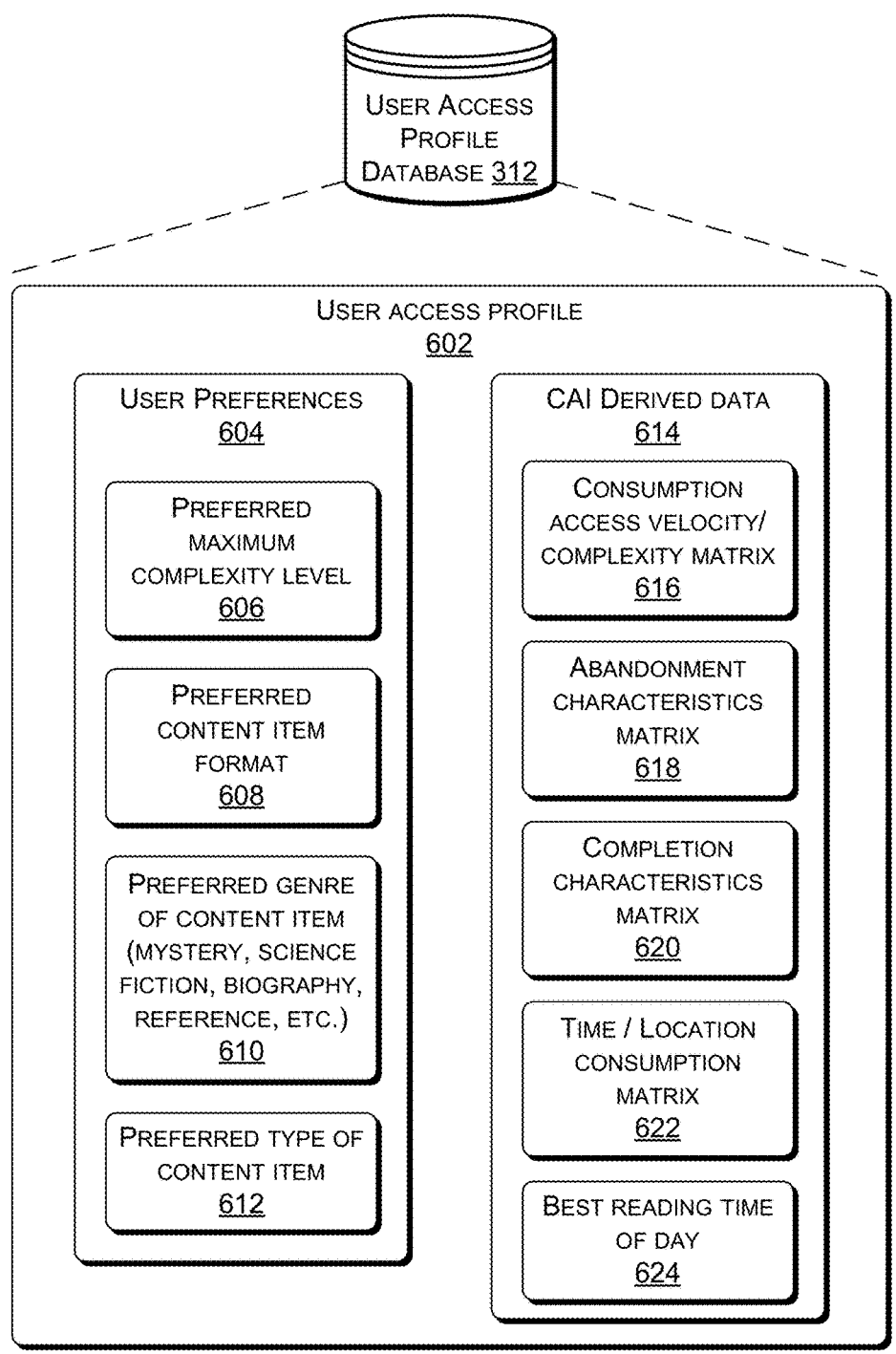
FIG. 6 shows an illustrative user access profile database of FIG. 3, which may be used to store user access profiles.

FIG. 6 shows the illustrative user access profile database 312 of FIG. 3, which is configured to contain a user access profile 602. The user access profile 602 may include a variety of information about the user 102(1) and their preferences. For discussion purposes, the user access profile 602 may include user preferences 604 that have been explicitly entered by a user 102(1) or derived from other user data. Further, such preferences 604 may be inferred over time from the user's behavior, or from examining behavior of other users 102(U) who are deemed to be similar to the user 102(1). These user preferences 604 may include the following:

A preferred maximum complexity level 606. For example, the user 102(1) prefers content items not exceeding a $7^{th}$ grade reading level.

A preferred content item format 608. For example, the user 102(1) prefers to use the text-to-speech function, largest font available, etc.

A preferred genre of content items 610, such as mystery, science fiction, biography, horror, reference, etc.

A preferred type of content item 612, such as text, audio, video, etc.

The user access profile 602 may also include CAI derived data 614 that has been derived from the CAEs 206. For discussion purposes, the CAI derived data 614 may include the following:

A consumption access velocity/complexity matrix 616. For example, a user (or group of users) 102(1)-(U) may have a matrix describing the relationship between access velocity and complexity. Thus, the user (or group of users) 102(1)-(U) may exhibit a high access velocity (such as 350 words per minute) with low complexity content items 106(1)-(I) such as a brochure, but may exhibit a low access velocity (such as 100 words per minute) for a high complexity content item 106(1)-(I) such as a math treatise.

An abandonment characteristics matrix 618. This matrix would characterize a relationship for a user (or group of users) 102(1)-(U) between consumption statistics and abandonment of the content item 106(1), including deleting or archiving the content item 106(1).

A completion characteristics matrix 620. This matrix would characterize a relationship for a user (or group of users) 102(1)-(U) between consumption statistics and completion of the content item 106(1).

A time/location consumption matrix 622 similar to the previous matrices. The time/location consumption matrix 622 establishes a relationship between clock time and location (such as venue or geolocation) and consumption of content 106(1)-(I). For example, a user 102(1) may have the most uninterrupted time to read from 7 a.m. to 8 a.m. while on the train.

A best reading time of day 624. For example, a user 102(1) may exhibit a personal highest average access velocity during 8 a.m. and 9 a.m. local time.

User Interaction

Figure 7:
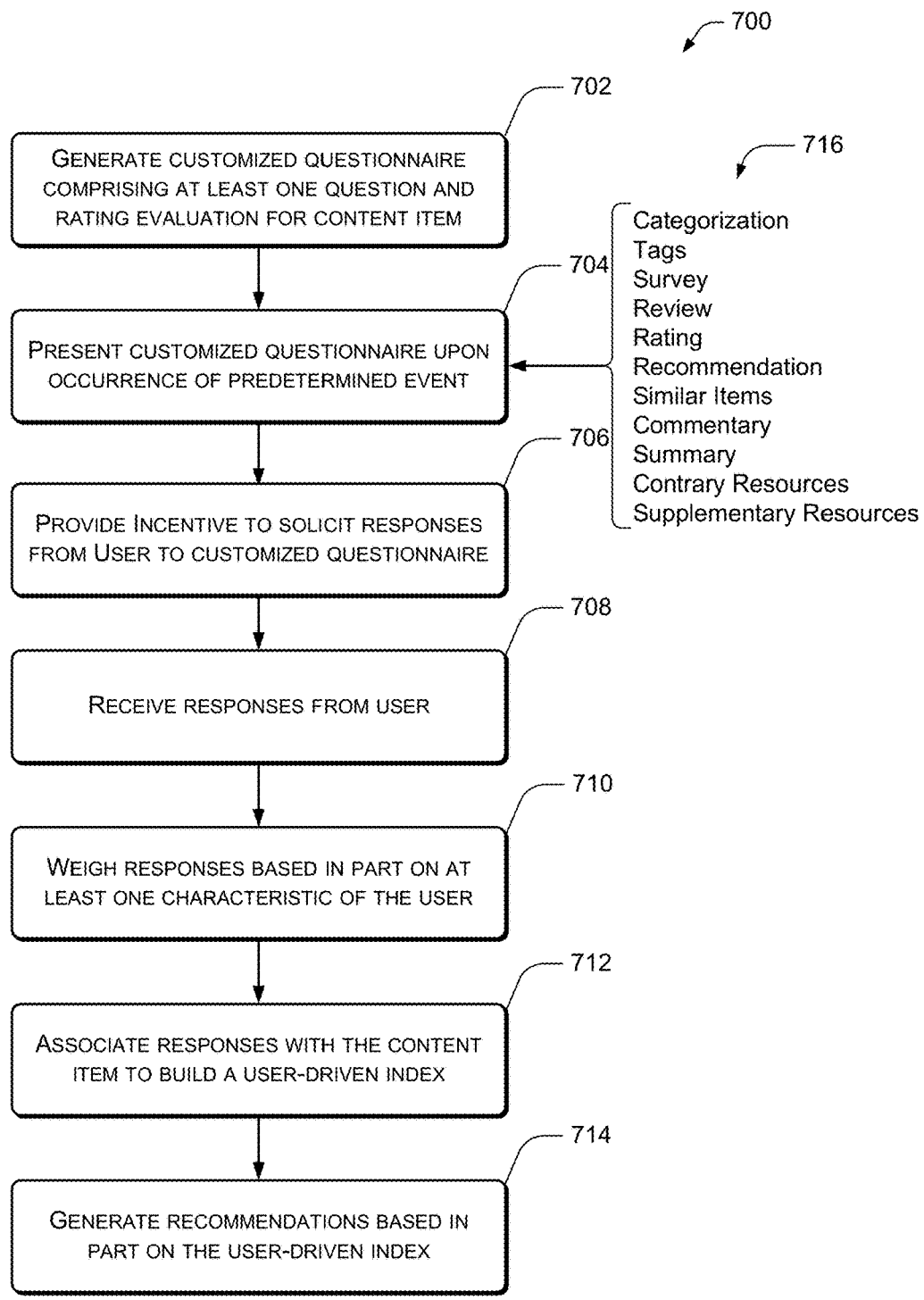
FIG. 7 is a flow diagram of an illustrative process of soliciting information from a user of a content item with a customized questionnaire upon the occurrence of a predetermined event.

FIG. 7 shows an illustrative process 700 of monitoring user interaction with content items 106(1)-(I) to determine the occurrence of a predetermined event and presenting customized questionnaires to solicit responses to questions or rating evaluations provided therein. The process 700 is illustrated as a collection of blocks in a logical flow graph, which represent a sequence of operations or operational logic that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Unless stated otherwise, the order in which the operations are described is not intended to be construed as a limitation, and any number of the described blocks can be combined in any order and/or in parallel to implement the process. For discussion purposes, the process will be described in the context of the architecture of FIGS. 1-6, in which the illustrated operations are performed under control of a device such as an electronic book reader device, which stores and executes instructions that implement the described functionality.

At block 702, a customized questionnaire is generated for a particular content item rendered for consumption by a user. The customized questionnaire can comprise of at least one question and/or rating evaluation based at least in part on the particular content item to classify the content item. Many content items have sequential portions, such as pages, chapters, episodes, tracks, scenes, etc., that are rendered in a natural order. Content items may be obtained or purchased from an electronic catalog and rendered in various ways, including by displaying content, playing audio or video content, or otherwise converting the item into a human perceptible form. In many cases, the user is also allowed to navigate arbitrarily within or between portions of the content item. As mentioned previously, the customized questionnaire may be supplied by a publisher, author or other source of the content items.

The customized questionnaire may comprise of questions or rating evaluations soliciting information from the user regarding the content item. The solicitation might include posing one or more questions regarding the content item or presenting one or more of a variety of different requests, such as requests for the items referenced by numeral 716 in FIG. 7, which include categorizations, tags, surveys, reviews, ratings, questions, etc. The user might be asked to provide original reviews, ratings, recommendations for similar items, discussion topics, discussion questions, audio/video commentaries, summaries, key topics, contrary resources, supplementary resources, and other types of information relating to the content item. Additionally, the user might be asked to identify other users who might enjoy the content item, and might be given the opportunity to gift or loan the content item to specified other users.

At block 704, the customized questionnaire is presented upon the occurrence of a predetermined event. The customized questionnaire may be presented as an interactive pop-up item when a user completes a particular portion of the content item, the entire content item or provides an indication that the user will not return to the content item in the near future. Alternatively, the user might be linked to a different page or website containing one or more requests for information. As detailed previously, the predetermined event can correspond to the conclusion of a page, chapter, content, annotation or highlight associated with the content item. Moreover, the expiration of an allotted amount of time or the manipulation of the content item on the device may also comply. Specifically, if a reasonable amount of time has passed between a user's handling of a content item, the user may be solicited for information underlying the reasons for the delay. In another example, if a user attempts to delete or move a content item to an archive file, a customized questionnaire may be presented to obtain feedback from the user as to the motivation for the acts of the user. In general, the customized questionnaire may be presented at a point in time that is not overly disruptive to the user's interaction with the content item. In the context of eBooks, for example, the following are some examples of the occurrence of predetermined events:

- The user reaches the last page of an eBook.
- The user navigates essentially through the majority or a threshold amount of the eBook, concluding a page near the end of the book.
- The user navigates sequentially through the last few pages of an eBook, including the last page.
- The user reaches the last page of an eBook and navigates away from the eBook.
- The user reaches the last page of an eBook and remains there for an unusually long time.
- The user initiates steps to delete an eBook from memory or move it to an archive file.

For other content items, analogous processes of monitoring user interaction through the content item may be used.

In some cases, such as when a content item has an appendix or other secondary matter following the primary content, the "end" of the content item may be ambiguous. This can be dealt with in different ways, depending upon implementation or upon preferences specified by a user. For example, some implementations may deem completion of a book upon reaching the end of the primary content, regardless of whether appended secondary matter has been consumed. Other embodiments may not deem a content item as being completed unless the user has navigated to the end of any secondary matter.

In some embodiments, the user may be prompted to confirm completion, and completion may be deemed to have happened only upon user confirmation or some other explicit user indication.

Note that different embodiments may use different mechanisms for detecting the occurrence of predetermined events associated with a user's interaction with content items. One embodiment might include comprehensive user activity monitoring by receiving CAEs, as described above, in which the occurrence of a predetermined event, such as the completion of the content item, is inferred or detected based on various different types of user activity information. Other embodiments may be implemented without such comprehensive user activity monitoring. For example, a particular reader device or program might be configured to simply notify or report when a user has reached the end of the content item or has navigated away from the end of the content item.

At block 706, an incentive may be offered to encourage the user to provide responses to the customized questionnaire. As previously detailed, the incentive may be monetary or non-monetary, with the amount of the incentive offered corresponding to the degree of completion of the customized questionnaire. In another implementation, the amount of the incentive can correspond directly to the content item. For example, a greater incentive can be offered to a user for providing responses to a customized questionnaire for an eBook with a certain amount of content (e.g., an amount of content that is analogous to a length of a physical book that is over 400 pages in length) vis-à-vis an eBook with less content (e.g., an amount of content that is analogous to a length of a physical book that is less than 100 pages in length).

At block 708, responses to the customized questionnaire are received. In some embodiments, the responses from the user can be in the form of free text input, selections from drop-down menus, list boxes, check boxes, radio buttons, sliders or any combination thereof. The responses might also comprise answers to questions or quizzes, ratings, reviews, recommendations for similar items, discussion topics, discussion questions, commentary, summaries, key topics, contrary resources, supplementary resources or materials, and so forth. The information may be entered directly, or might be provided by way of links or references.

Responses may also be supplied at varying times. In one instance, a user may partially provide responses to a questionnaire, may interact with a different content item on the device, and later go back to the partially completed questionnaire to respond to further questions or inquiries.

At block 710, the responses are weighted based in part on a characteristic of the user. This can be accomplished by determining and assigning a credibility score or other indication of usefulness or trustworthiness. As described above, CAEs can be evaluated to determine characteristics of the user's interaction with the content item prior to its completion, such as whether the user read every page of a book, viewed every chapter of a movie, listened to the entirety of a song or album, and so forth. The CAEs may also contain other information relevant to the user's engagement with the content item, such as characteristics of annotations made by the user, the number of portions or pages viewed or rendered, the length of time that individual pages or portions were viewed or rendered, the length of time that the content item as a whole was viewed or rendered, the elapsed time from starting the content item to completing it, whether the content item was consumed in a single uninterrupted session, and other characteristics of the user's interaction with the content item. These factors and others can be weighted and combined to form a validity or credibility score that indicates the estimated validity, value, or trustworthiness of the information received from the user.

In another embodiment, the characteristic of the user may comprise a history of providing responses to past questionnaires or the quality and extent of the user's responses. The characteristic may also comprise qualities inherent to the user. For example, responses to a questionnaire obtained from a professor teaching microbiology at a university regarding a book about food-borne illnesses can be weighed favorably compared to responses from others for the same book.

At block 712, the responses are associated with the content item. As mentioned above, the content database 308 is configured to contain content item information 402. The information in the responses can be incorporated to supplement or enhance the data stored in the content database 308. For example, a user provides a suitability rating of "R" for a book about terrorism due to the book's inclusion of graphic depictions of violence and strong language not appropriate for those under the age of 17. The "R" rating can be associated with the book and included in the content item information 402, specifically as part of the suitability of content item 420. After collecting and associating information from responses to the customized questionnaires, the information can be used to establish and maintain a user-driven index or taxonomy of the content items to determine, for example, how one content item may relate to one or more other content items.

At block 714, recommendations may be generated based on the user-driven index incorporating information derived from the responses for the customized questionnaires and the usage metrics detailed above. As one example, recommendations may be made to consume other content items. For instance, the service may determine other content items that seem suitable for a reader who exhibits a certain reading rate or subject matter complexity level. As still another example, recommendations may suggest one or more services to try. For instance, suppose an adult user exhibits a below normal reading rate. In such situations, a recommendation may be made to seek out a reading serviced for speed reading techniques. Recommendations for activities may also be generated based on content usage metrics and the responses for the customized questionnaires. For instance, if the user consistently accesses content items pertaining to mountain biking, a recommendation may be made to join a local mountain biking club or register for an upcoming mountain biking event.

In another example, recommendations may purposefully not include certain content items in view of the users and/or the responses for the content items. For instance, content items that are associated with suitability ratings of PG-13 or higher may not be included to users identified as minors or to users who seek to avoid such content items.

Validity or credibility scores may be displayed along with the corresponding information supplied by the users. Alternatively, recommendations may be filtered based on credibility scores. For example, it might be useful in some situations to display only that recommendation that is associated with higher credibility scores. In other situations, composite recommendations about a particular content item might be compiled using only the user input that is associated with higher credibility scores, or by weighting user input depending on its credibility scores.

Figure 8:
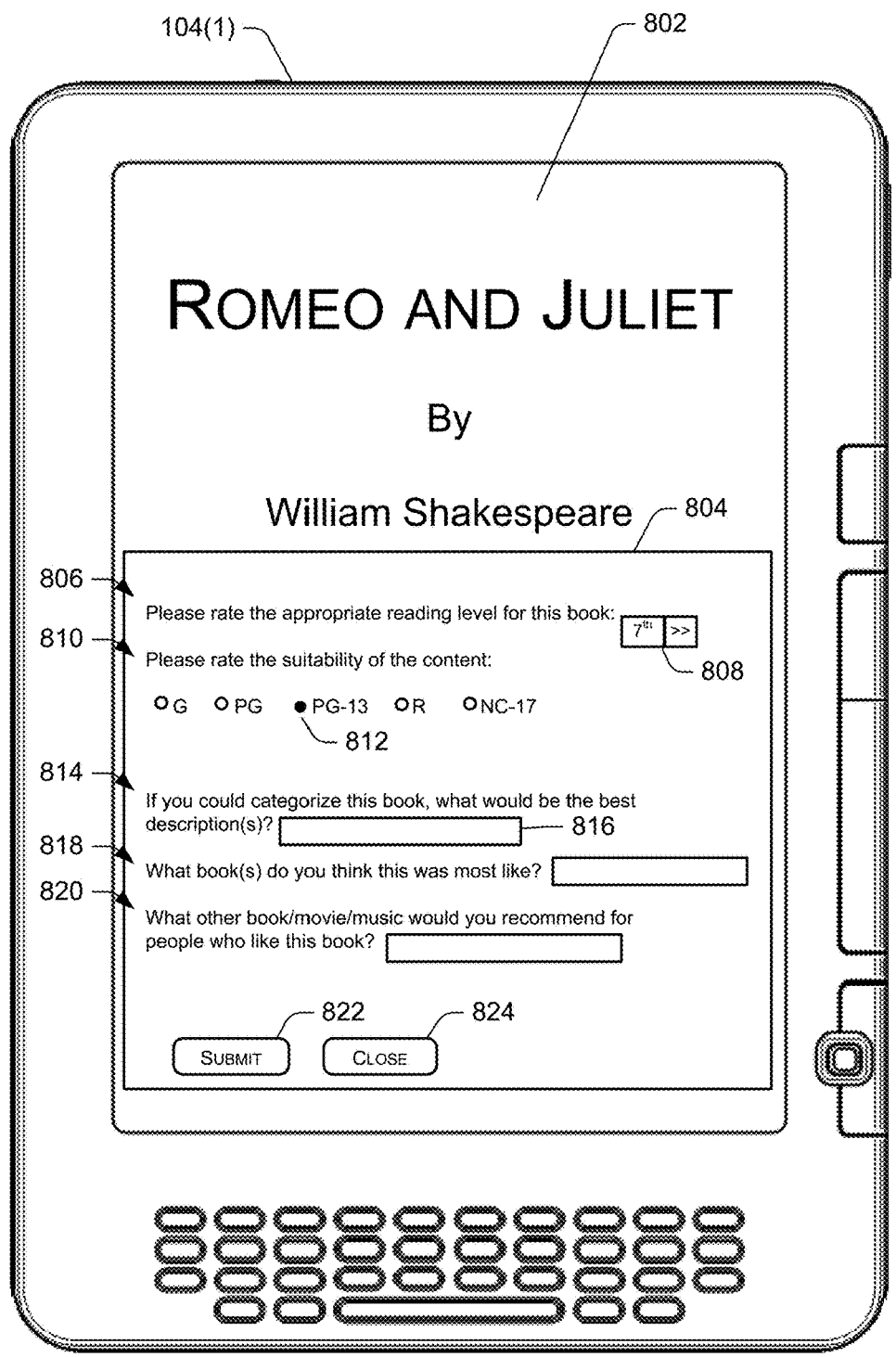
FIG. 8 shows an example user interface illustrating a customized questionnaire soliciting user input for an electronic book ("eBook").

FIG. 8 shows the eBook reader device 104(1) while presenting an example of a customized questionnaire. This example illustrates completion of an eBook 802 entitled "Romeo and Juliet". Upon the occurrence of a predetermined event, the reader device 104(1) displays a pop-up or overlay customized questionnaire pane 804. The customized questionnaire pane 804 can contain questions, requests, rating evaluations, multiple choice problems, quizzes, tests, etc., as described above.

In this example, the questionnaire 804 contains a request 806 for the user to rate the appropriate reading level for the eBook 802 in the form of a list box 808, a question 810 asking the user to rate the suitability of the content of the book in the form of radio buttons 812 corresponding to a widely familiar ratings scheme, a question 814 asking the user to categorize the book in the form of a text entry box 816, a question 818 to identify another similar book, and a request 820 for the user to identify other content items that the user would recommend for others who enjoyed this book. A user may provide answers to one or more of the questionnaire items and submit them by selecting a control 822, which is labeled "Submit". Alternatively, the user may ignore the questionnaire by selecting a "Close" control 824.

In some instance, a questionnaire may include multiple questions or requests, presented in a series of individual panes 804. Alternatively, multiple questions or rating evaluation can be presented in a single pane as shown, or a questionnaire might consist of only a single question or rating evaluation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A computer-implemented method comprising:
under control of one or more computer systems configured with executable instructions,
receiving an indication of a user interaction, via a user device, with an electronic book;
identifying, from a user profile, an association between a genre of electronic books and content access event (CAE) data, the CAE data including at least one of a particular time of day or a particular location;
determining, based at least in part on the indication, an occurrence of an event that is associated with at least a portion of the CAE data;

determining a rate of abandonment of electronic books associated with an ambient light intensity that is equal to or below a threshold value;

determining, based at least partly on the indication, that a current ambient light intensity received by the user device is at or below the threshold value;

generating a customized questionnaire associated with the electronic book that includes at least one question based at least in part on the genre of electronic books, the at least one question including a question associated with an abandonment of the electronic book;

sending the customized questionnaire to the user device upon an occurrence of a predetermined event to solicit a response to the at least one question;

receiving the response from the user device;

associating the response with the electronic book to build or update a user-driven index of a catalog; and generating a different customized questionnaire for the electronic book, the different customized questionnaire including at least one different question based at least in part on the response.

2. The computer-implemented method of claim 1, further comprising:

causing display of a user interface on the user device, the user interface including one or more of free text user input, menus, list boxes, check boxes, radio buttons, or sliders to receive the response.

3. The computer-implemented method of claim 1, further comprising:

detecting an expiration of an allotted amount of time after a commencement of the user interaction, and wherein the predetermined event is based at least at least in part on the expiration of the allotted amount of time.

4. The computer-implemented method of claim 1, further comprising:

detecting that the electronic book is being associated with at least one other electronic book in a collection of electronic books on the user device, and wherein the user interaction is based at least in part on detecting that the electronic book is being associated.

5. The computer-implemented method of claim 1, wherein the indication of the user interaction is a first indication, and further comprising:

receiving a second indication, via the user device, of an annotation to be associated with a portion of the electronic book, and wherein the customized questionnaire includes an additional question that solicits a recommendation for similar items based in part on the annotation associated with the portion of the electronic book.

6. The computer-implemented method of claim 1, further comprising:

causing display of at least one additional question within the customized questionnaire that solicits information regarding a category of the electronic book, a subject of the electronic book, a style of the electronic book, a format of the electronic book, or a language of the electronic book.

7. The computer-implemented method of claim 1, further comprising:

causing display of at least one additional question that is associated with assessing a reading level of the electronic book.

8. The computer-implemented method of claim 1, further comprising weighting the response based in part on a characteristic of the user profile associated with the user device.

9. The computer-implemented method of claim 8, further comprising:

identifying, from the user profile, previous responses to other customized questionnaires, and wherein the characteristic is based at least in part on the previous responses.

10. The computer-implemented method of claim 1, further comprising providing an incentive to provide the response to the customized questionnaire.

11. The computer-implemented method of claim 1, further comprising generating a recommendation based at least in part on the user-driven index.

12. A computer-implemented method comprising:

under control of one or more computer systems configured with executable instructions, receiving, from a user device, an indication of a user interaction, the user interaction including a purchase of a content item of a plurality of content items;

determining a rate of abandonment of content items associated with an ambient light intensity that is equal to or below a threshold value;

determining, based at least partly on the indication, that a current ambient light intensity received by the user device is at or below the threshold value;

generating a customized questionnaire for the content item of the plurality of content items;

causing display of the customized questionnaire on the user device based at least in part on the indication, the customized questionnaire to solicit a response to at least one question that is associated with an abandonment of the content item;

receiving, via the user device, the response;

associating the response with the content item to build or update a user-driven index comprising the plurality of content items; and generating a different customized questionnaire for the content item that includes at least one different question based at least in part on the response, and a recommendation for at least one activity.

13. The computer-implemented method of claim 12, further comprising:

causing display of at least one additional question within the customized questionnaire that solicits a request for items that are identified as similar to at least one of the plurality of content items.

14. The computer-implemented method of claim 12, further comprising:

causing display of at least one additional question that assesses an education level or reading level commensurate with at least one of the plurality of content items.

15. The computer-implemented method of claim 12, further comprising:

detecting an occurrence of a predetermined event that includes at least one of a conclusion of a page of a content item, a conclusion of a chapter or a conclusion of another predefined section of the content item, an insertion of an annotation into the content item, or an expiration of an allotted amount of time; and wherein causing display of the customized questionnaire on the user device is further based at least in part on the occurrence of the predetermined event.

16. The computer-implemented method of claim 12, further comprising generating a recommendation based at least in part on the user-driven index.

17. A device comprising:
one or more processors;
memory accessible by the one or more processors; and
operational logic stored in the memory and executable on the one or more processors to perform actions comprising:
  causing, via a user interface, display of a portion of an electronic content item;
  detecting a user interaction with the electronic content item;
  determining a rate of abandonment of content items associated with an ambient light intensity that is equal to or below a threshold value;
  determining, based at least partly on the indication, that a current ambient light intensity received by the device is at or below the threshold value;
  causing, via the user interface, display of a customized questionnaire to solicit a response to at least one question based at least in part on the electronic content item, the at least one question being associated with an abandonment of the electronic content item;
  receiving the response;
  transmitting the response for incorporation to a user-driven index;
  and
  causing, via the user interface, display of a recommendation for at least one activity associated with the response.

18. The device of claim 17, wherein the portion of the electronic content item comprises one or more of pages of the electronic content item, chapters of the electronic content item, episodes of the electronic content item, tracks of the electronic content item, or scenes of the electronic content item.

19. The device of claim 17, wherein the electronic content item comprises one or more of books, magazines, periodicals, photographs, audio, video, or music.

20. The device of claim 17, wherein the operational logic is further executable by the one or more processors to perform actions comprising:
  detecting an occurrence of one or more of a conclusion of a page, chapter, episode, track, scene, or other predefined section of the electronic content item, or expiration of an allotted amount of time, and
  detecting a motion of the device at least partly after detecting the occurrence.

21. The device of claim 17, wherein the operational logic is further executable by the one or more processors to perform actions comprising:
  detecting an occurrence of a plurality of electronic content items being organized on the device, and
  detecting a motion of the device at least partly after detecting the occurrence.

22. The device of claim 17, wherein the at least one question solicits a recommendation for similar items based at least in part on the electronic content item.

23. The device of claim 17, wherein the at least one question solicits information comprising one or more of category, subject, genre, style, format, or language of the electronic content item.

24. The computer-implemented method of claim 1, wherein the user device includes an ambient light sensor that measures the current ambient light intensity.

25. The computer-implemented method of claim 1, further comprising:
  generating a recommendation that includes at least one or more services based at least in part on the electronic book and the response.

26. The computer-implemented method of claim 1, wherein the user device includes one or more accelerometers, and further comprising:
  determining, based at least partly on the indication, that a motion of the user device corresponds to walking, and
  wherein the different customized questionnaire includes a recommendation for activities associated with walking.

27. The computer-implemented method of claim 1, wherein the indication of the user interaction is a first indication, and further comprising:
  receiving, via the user device, a second indication of an annotation to be associated with a portion of the electronic book, and
  wherein the customized questionnaire includes at least one question that is associated with the portion of the electronic book.

28. The computer-implemented method of claim 7, further comprising:
  assessing the reading level of the electronic book based at least in part on the response; and
  causing display of a recommendation of additional electronic content items based at least in part on the reading level.

29. The computer-implemented method of claim 12, further comprising:
  determining a credibility score of a user associated with the user device, the credibility score based at least in part on at least one of a measurement of user interaction with the content item or a qualification associated with the user as an expert of subject matter associated with the content item; and
  determining a review value based at least in part on the credibility score,
  wherein generating the at least one different question is further based at least in part on the review value being greater than a predetermined threshold.

30. The device of claim 17, wherein the operational logic is further executable by the one or more processors to perform actions comprising:
  determining that an annotation is to be associated with a portion of the electronic content item, based at least in part on detecting the user interaction with the electronic content item, and
  wherein the at least one question of the customized questionnaire is further based at least in part on the annotation.

31. The device of claim 17, wherein the operational logic is further executable by the one or more processors to perform actions comprising:
  detecting an occurrence of a predetermined event associated with the user interaction with the electronic content item, the predetermined event occurring after a purchase of the electronic content item, and
  wherein causing display of the customized questionnaire is further based at least in part on the occurrence of the predetermined event.

32. The device of claim 17, wherein the electronic content item is a first electronic content item, the response is a first response, the customized questionnaire is a first customized questionnaire, and wherein the operational logic is further executable by the one or more processors to perform actions comprising:

presenting a portion of a second electronic content item for consumption, based at least in part on receiving the first response; and presenting a second customized questionnaire that includes at least one second question based at least in part on the second electronic content item and the first response.

33. The device of claim 17, wherein the recommendation is a first recommendation, and wherein the operational logic is further executable by the one or more processors to perform actions comprising:

presenting a second recommendation of an additional electronic content item that is similar to the electronic content item, the additional electronic content item including at least one of electronic books, periodicals, music, movies, photographs, audio files, or video files.

* * * * *